(12) United States Patent
Li et al.

(10) Patent No.: US 11,359,579 B2
(45) Date of Patent: Jun. 14, 2022

(54) MULTI-REDUNDANCY ELECTROMECHANICAL SERVO SYSTEM FOR REGULATING LIQUID ROCKET ENGINE AND IMPLEMENTATION METHOD THEREFOR

(71) Applicant: XI' AN AEROSPACE PROPULSION INSTITUTE, Shaanxi (CN)

(72) Inventors: Bin Li, Xi'an (CN); Hui Chen, Xi'an (CN); Xiaoguang Zhang, Xi'an (CN); Yalong Yang, Xi'an (CN); Jingfang Wei, Xi'an (CN); Yushan Gao, Xi'an (CN); Guochuang Dong, Xi'an (CN); Dongying Ma, Xi'an (CN); Weiyu Chen, Xi'an (CN); Xingxing Pu, Xi'an (CN)

(73) Assignee: XI' AN AEROSPACE PROPULSION INSTITUTE, Shaanxi (CN)

( * ) Notice: Subject to any disclaimer, the term of this patent is extended or adjusted under 35 U.S.C. 154(b) by 9 days.

(21) Appl. No.: 16/963,471

(22) PCT Filed: Feb. 21, 2019

(86) PCT No.: PCT/CN2019/075651
§ 371 (c)(1),
(2) Date: Jul. 20, 2020

(87) PCT Pub. No.: WO2019/205787
PCT Pub. Date: Oct. 31, 2019

(65) Prior Publication Data
US 2020/0362796 A1    Nov. 19, 2020

(30) Foreign Application Priority Data

Apr. 28, 2018  (CN) .......................... 201810398616.7

(51) Int. Cl.
*F02K 9/56* (2006.01)
*F02K 9/60* (2006.01)
(Continued)

(52) U.S. Cl.
CPC .................. *F02K 9/56* (2013.01); *F02K 9/42* (2013.01); *F02K 9/58* (2013.01); *F02K 9/60* (2013.01);
(Continued)

(58) Field of Classification Search
CPC ..... F02K 9/42; F02K 9/56; F02K 9/58; G05B 9/03; F15B 18/00; G06F 11/1641
See application file for complete search history.

(56) References Cited

U.S. PATENT DOCUMENTS 3,279,744 A * 10/1966 Fieldsen ............... F16K 31/055
                                                    251/129.03
5,647,201 A    7/1997 Hook et al.
(Continued)

FOREIGN PATENT DOCUMENTS

CN    105523197 A    4/2016
CN    105626312 A    6/2016
(Continued)

OTHER PUBLICATIONS

PCT International Search Report, PCT/CN2019/075651, dated May 23, 2019, pp. 1-11.

*Primary Examiner* — Todd E Manahan
*Assistant Examiner* — Kyle Robert Thomas
(74) *Attorney, Agent, or Firm* — Fenwick & West LLP

(57) ABSTRACT

A multi-redundancy electromechanical servo system for regulating a liquid rocket engine, comprising a triple-redundancy servo controller (1), a double-redundancy servo driver (2), double-winding electromechanical actuators (4, 5), a triple-redundancy position sensor (6), a thrust regulator (8)

(Continued)

and a mixed ratio regulator (9). Engine thrust, a mixed ratio regulation instruction and a feedback signal of the triple-redundancy position sensor are inputted to the triple-redundancy servo controller, and the triple-redundancy servo controller outputs thrust and mixed ratio regulation PWM wave control signals to the double-redundancy servo driver. The double-redundancy servo driver outputs a three-phase variable-frequency variable-amplitude sine wave current to drive the double-winding electromechanical actuators to drive the thrust regulator and the mixed ratio regulator to move, thus achieving engine thrust and mixed ratio regulation. The present servo system has a simple system and excellent control characteristics, has the ability to "control a two-degree fault operation and drive a one-degree fault operation", and significantly improves the reliability and usage maintainability of the thrust and mixed ratio regulation of the liquid rocket engine. Also disclosed is a method for implementing the foregoing multi-redundancy electromechanical servo system.

1 Claim, 1 Drawing Sheet

(51) Int. Cl.
*F15B 18/00* (2006.01)
*F02K 9/42* (2006.01)
*F02K 9/58* (2006.01)
*G06F 11/16* (2006.01)
*G05B 9/03* (2006.01)

(52) U.S. Cl.
CPC ............ *F15B 18/00* (2013.01); *G05B 9/03* (2013.01); *G06F 11/1641* (2013.01); *F05D 2270/3015* (2013.01)

(56) References Cited

U.S. PATENT DOCUMENTS

| | | | |
|---|---|---|---|
| 6,619,031 B1* | 9/2003 | Balepin | B64G 1/401 60/246 |
| 6,965,206 B2* | 11/2005 | Kamen | B62D 57/00 318/139 |
| 8,504,178 B2* | 8/2013 | Kakino | G05B 9/03 700/81 |
| 2009/0199823 A1* | 8/2009 | Mahoney | F02C 9/30 123/497 |
| 2010/0121552 A1 | 5/2010 | Le Gonidec et al. | |
| 2010/0222900 A1* | 9/2010 | Kakino | G05B 9/03 700/82 |
| 2016/0026166 A1* | 1/2016 | Gamer | G05B 19/0428 700/81 |
| 2016/0365819 A1* | 12/2016 | Masuda | H02P 6/08 |

FOREIGN PATENT DOCUMENTS

| | | |
|---|---|---|
| CN | 105630002 A | 6/2016 |
| CN | 106368852 A | 2/2017 |
| CN | 108661823 A | 10/2018 |

* cited by examiner

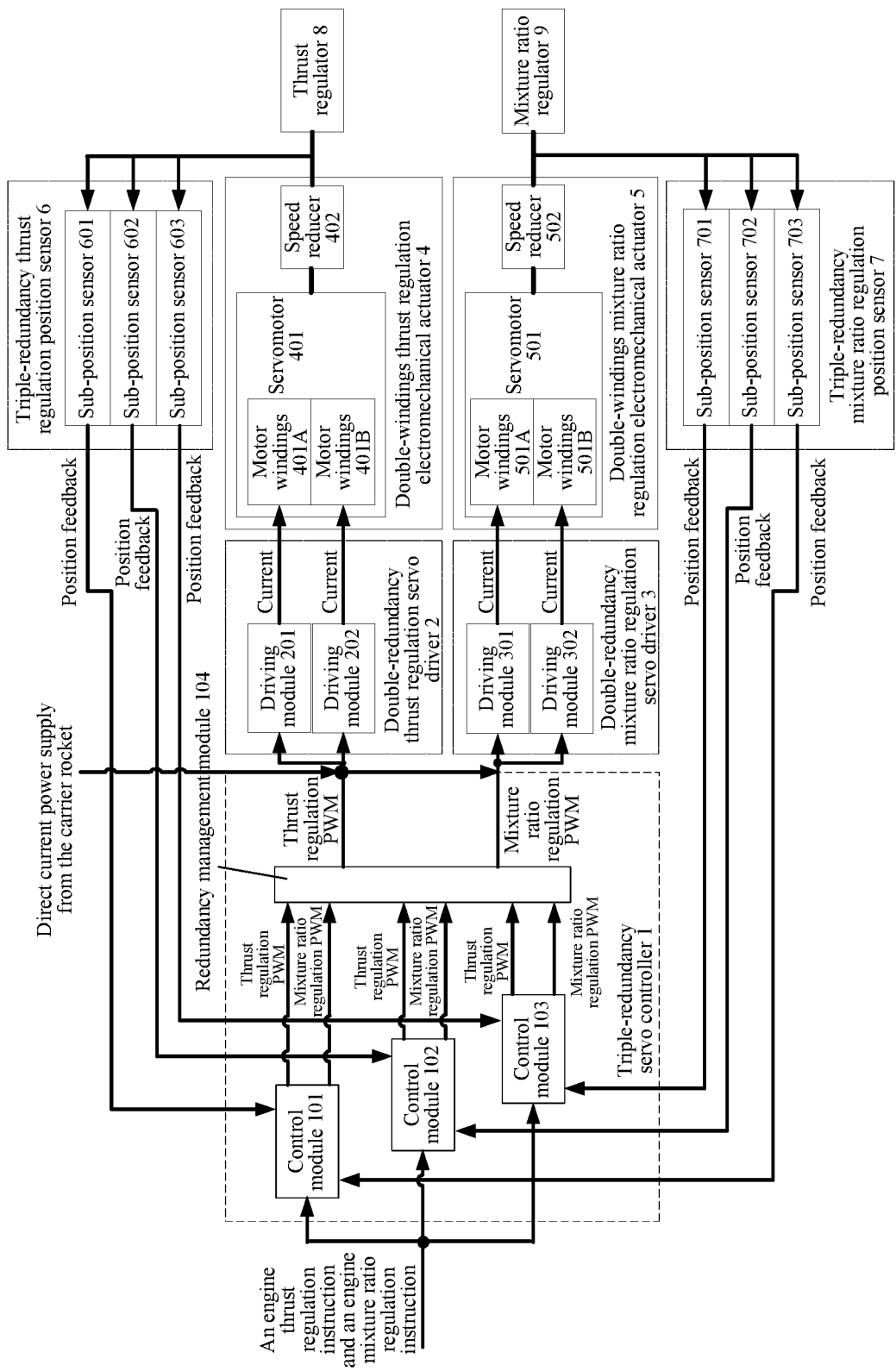

MULTI-REDUNDANCY ELECTROMECHANICAL SERVO SYSTEM FOR REGULATING LIQUID ROCKET ENGINE AND IMPLEMENTATION METHOD THEREFOR

The present application claims priority to Chinese Patent Application No. 201810398616.7, titled "MULTI-REDUNDANCY ELECTROMECHANICAL SERVO SYSTEM FOR REGULATING THRUST AND MIXTURE RATIO OF LIQUID ROCKET ENGINE", filed on Apr. 28, 2018 with the China National Intellectual Property Administration, which is incorporated herein by reference in its entirety.

FIELD

The present disclosure relates to a multi-redundancy electromechanical servo system for regulating a liquid rocket engine and a method performed by the system. The method and the system belong to the field of control of thrust regulation and mixture ratio regulation of a liquid rocket engine.

BACKGROUND

Electro-hydraulic servo control or stepping motor control are generally adopted in early liquid rocket engines. The Space Shuttle Main Engine SSME has a controller for controlling electro-hydraulic servo actuated valves to achieve closed-loop regulation of thrust and mixture ratio. Seven-bit digital electro-hydraulic servo actuated valves are adopted in the Russian RD-171M and RD-180 engines to achieve closed-loop regulation of thrust and mixture ratio. Energy of an actuator is supplied by a motor pump supply device on the ground before the engine starts and is supplied by a flow diverted by a fuel pump after the engine reaches a certain operating condition. A stepping motor is adopted in the Russian NK-33 and RD-0120 engines to regulate thrust and mixture ratio. The stepping motors are adopted in the Chinese YF-115 and YF-24 engines to regulate thrust and mixture ratio.

The energy supply, control drive and actuator mechanism of the electro-hydraulic servo system are complex. Use maintainability and reliability of the electro-hydraulic servo system are poor and the electro-hydraulic servo system has a poor adaptability for different thrust or mixture ratio regulation tasks.

A stepping motor regulation is of an open-loop control mode. The stepping motor regulation has a poor regulation accuracy, a slow regulation rate and a small output torque, which cannot meet a regulation demand of a high accuracy, a fast response and a large torque.

An electromechanical servo control can achieve all functions of the electro-hydraulic servo control and the system is more simple. Energy required by the electromechanical servo system is electric energy, which is uncorrelated with the engine, such that a gas-liquid system of the engine can be greatly simplified. In addition, the electromechanical servo system has a good use maintainability and a high reliability, such that the electromechanical servo system can be used in different thrust and mixture ratio regulation tasks of different engines by adjusting control software and driving power supply parameters. Therefore, the electromechanical servo system is a development trend of engine regulation control. In the 1990s, America developed a valve electromechanical servo system prototype for SSME and STME engines. In 2006, Germany successfully developed a valve electromechanical servo system prototype for upper-stage rocket engines. Japan and France adopts an electromechanical servo control in a new generation of high-thrust engines LE-X and VULCAIN X.

At present, main problems existing in the electromechanical servo system for regulating thrust and mixture ratio of a liquid rocket engine include the following two points.

(1) A multi-redundancy electromechanical actuator is relatively large in size and weight, such that an application demand of small size and light weight of the liquid rocket engine cannot be satisfied.

(2) A servo driver has a low inherent reliability and a high failure rate, which are weak links of the reliability of the electromechanical servo control.

SUMMARY

The present disclosure is to provide an electromechanical servo system for operating condition regulation of a liquid rocket engine with "triple-redundancy control and double-redundancy driving" and a method performed by the system, to overcome defects in conventional technologies and satisfy a demand of a high reliability, a high accuracy and a fast response in regulating thrust and mixture ratio of an engine with a small size and a light weight of the engine.

Technical solutions according to the present disclosure are as follows.

A multi-redundancy electromechanical servo system, for liquid rocket engine regulation, includes: a servo controller, a thrust regulation servo driver, a mixture ratio regulation servo driver, a thrust regulation electromechanical actuator, a mixture ratio regulation electromechanical actuator, a thrust regulation position sensor, a mixture ratio regulation position sensor, a thrust regulator and a mixture ratio regulator.

The servo controller includes three independent control modules and a redundancy management module. Each of the control modules is configured to: receive an engine thrust regulation instruction and an engine mixture ratio regulation instruction issued by an onboard computer of a carrier rocket and position information fed back from the thrust regulation position sensor and the mixture ratio regulation position sensor, independently perform a thrust regulation calculation and a mixture ratio regulation calculation to obtain a thrust regulation PWM wave control signal and a mixture ratio regulation PWM wave control signal, and output the thrust regulation PWM wave control signal and the mixture ratio regulation PWM wave control signal to the redundancy management module.

The redundancy management module is configured to: perform a state monitoring and a cross-comparison on the control signals outputted from the three control modules, and select a proper control module to output the thrust regulation PWM wave control signal to the thrust regulation servo driver and output the mixture ratio regulation PWM wave control signal to the mixture ratio regulation servo driver.

The thrust regulation servo driver is configured to: invert a direct current power supply from the carrier rocket based on the thrust regulation PWM wave control signal to produce a three-phase sinusoidal current with a variable amplitude and a variable frequency, and output the sinusoidal current to the thrust regulation electromechanical actuator.

The mixture ratio regulation servo driver is configured to: invert the direct current power supply from the carrier rocket based on the mixture ratio regulation PWM wave control signal to produce a three-phase sinusoidal current with a variable amplitude and a variable frequency, and output the sinusoidal current to the mixture ratio regulation electromechanical actuator.

The thrust regulation electromechanical actuator is configured to: move under a drive of the sinusoidal current outputted by the thrust regulation servo driver, and drive the thrust regulator to move to cause the thrust regulator to reach a position corresponding to the engine thrust regulation instruction issued by the onboard computer of the carrier rocket.

The mixture ratio regulation electromechanical actuator is configured to: move under a drive of the sinusoidal current outputted by the mixture ratio regulation servo driver, and drive the mixture ratio regulator to move to cause the mixture ratio regulator to reach a position corresponding to the engine mixture ratio regulation instruction issued by the onboard computer of the carrier rocket.

The thrust regulation position sensor is configured to: collect position information of the thrust regulator in a real time manner, and feed the position information of the thrust regulator back to the servo controller.

The mixture ratio regulation position sensor is configured to: collect position information of the mixture ratio regulator in a real time manner, and feed the position information of the mixture ratio regulator back to the servo controller.

The thrust regulation servo driver includes two independent driving modules. Each of the driving modules is configured to: receive the thrust regulation PWM wave control signal from the servo controller, independently invert the power supply to produce a three-phase sinusoidal current with a variable amplitude and a variable frequency, and output the sinusoidal current to the thrust regulation electromechanical actuator.

The mixture ratio regulation servo driver includes two independent driving modules. Each of the driving modules is configured to: receive the mixture ratio regulation PWM wave control signal from the servo controller, independently invert the power supply to produce a three-phase sinusoidal current with a variable amplitude and a variable frequency, and output the sinusoidal current to the mixture ratio regulation electromechanical actuator.

Each of the thrust regulation electromechanical actuator and the mixture ratio regulation electromechanical actuator includes a servomotor and a speed reducer.

The servomotor of the thrust regulation electromechanical actuator is configured to move under the drive of the three-phase sinusoidal current with a variable amplitude and a variable frequency outputted by the thrust regulation servo driver. The movement of the servomotor is transmitted by the speed reducer of the thrust regulation electromechanical actuator and is converted into a movement of the thrust regulator, to cause the thrust regulator to reach a position corresponding to the engine thrust regulation instruction issued by the onboard computer of the carrier rocket in a rate indicated by the instruction, thereby achieving an engine thrust regulation.

The servomotor of the mixture ratio regulation electromechanical actuator is configured to move under the drive of the three-phase sinusoidal current with a variable amplitude and a variable frequency outputted by the mixture ratio regulation servo driver. The movement of the servomotor is transmitted by the speed reducer of the mixture ratio regulation electromechanical actuator and is converted into a movement of the mixture ratio regulator, to cause the mixture ratio regulator to reach a position corresponding to the engine mixture ratio regulation instruction issued by the onboard computer of the carrier rocket in a rate indicated by the instruction, thereby achieving an engine mixture ratio regulation.

The servomotor in each of the thrust regulation electromechanical actuator and the mixture ratio regulation electromechanical actuator includes two independent sets of three-phase windings. The two sets of three-phase windings of the servomotor in the thrust regulation electromechanical actuator are connected with the two driving modules of the thrust regulation servo driver in one-to-one correspondence to form two independent thrust regulation driving circuits. The two sets of three-phase windings of the servomotor in the mixture ratio regulation electromechanical actuator are connected with the two driving modules of the mixture ratio regulation servo driver in one-to-one correspondence to form two independent mixture ratio regulation driving circuits.

The servomotor in each of the thrust regulation electromechanical actuator and the mixture ratio regulation electromechanical actuator is a permanent magnet synchronous motor.

The thrust regulation position sensor includes three independent sub-position sensors in one-to-one correspondence with the three control modules of the servo controller. Each of the sub-position sensors is configured to: independently detect the position information of the thrust regulator, and feed the position information of the thrust regulator back to the control module of the servo controller corresponding to the sub-position sensor.

The mixture ratio regulation position sensor includes three independent sub-position sensors in one-to-one correspondence with the three control modules of the servo controller. Each of the sub-position sensors is configured to: independently detect the position information of the mixture ratio regulator, and feed the position information of the mixture ratio regulator back to the control module of the servo controller corresponding to the sub-position sensor.

A method, performed by the multi-redundancy electromechanical servo system for liquid rocket engine regulation, includes: step 1, receiving, by each of the three control modules of the servo controller, the engine thrust regulation instruction and the engine mixture ratio regulation instruction issued by the onboard computer of the carrier rocket and the position information of the thrust regulator fed back from the thrust regulation position sensor and the position information of the mixture ratio regulator fed back from the mixture ratio regulation position sensor in a real time manner; independently performing, by each of the control modules, the thrust regulation calculation and the mixture ratio regulation calculation to obtain the thrust regulation PWM wave control signal and the mixture ratio regulation PWM wave control signal; step 2, performing, by the redundancy management module, the state monitoring and the cross-comparison on the PWM wave control signals outputted from the three control modules; managing, by the redundancy management module, an operation mode of each of the three control modules based on results of the state monitoring and the cross-comparison; and selecting, by the redundancy management module, a proper control module to output the thrust regulation PWM wave control signal to the thrust regulation servo driver and output the mixture ratio regulation PWM wave control signal to the mixture ratio regulation servo driver; step 3, inverting, by each driving module of the thrust regulation servo driver, the direct current power supply from the carrier rocket based on the thrust regulation PWM wave control signal to produce the three-phase sinusoidal current with a variable amplitude and a variable frequency, to provide power to the set of three-phase windings of the thrust regulation electromechanical actuator corresponding to the driving module; detecting, by the redundancy management module, currents and voltages of the two thrust regulation driving circuits and temperatures of the driving modules of the two thrust regulation driving circuits in a real time manner to monitor a fault; when it is monitored that a fault occurs in a driving circuit, cutting off, by the redundancy management module, a loop of the driving circuit having the fault, to cause the driving circuit having the fault to be in an open circuit state; step 4, moving, by the thrust regulation electromechanical actuator, and driving, by the thrust regulation electromechanical actuator, the thrust regulator to move, to cause the thrust regulator to reach a position corresponding to the engine thrust regulation instruction issued by the onboard computer of the carrier rocket, thereby achieving the engine thrust regulation; step 5, inverting, by each of the two driving modules, the direct current power supply from the carrier rocket based on the mixture ratio regulation PWM wave control signal to produce the three-phase sinusoidal current with a variable amplitude and a variable frequency, to provide power to the set of three-phase windings of the mixture ratio regulation electromechanical actuator corresponding to the driving module; detecting, by the redundancy management module, currents and voltages of the two mixture ratio regulation driving circuits and temperatures of the driving modules of the two mixture ratio regulation driving circuits in a real time manner, to monitor a fault; when it is monitored that a fault occurs in a driving circuit, cutting off, by the redundancy management module, a loop of the driving circuit having the fault, to cause the driving circuit having the fault to be in an open circuit state; and step 6, moving, by the mixture ratio regulation electromechanical actuator, and driving, by the mixture ratio regulation electromechanical actuator, the mixture ratio regulator to move, to cause the mixture ratio regulator to reach a position corresponding to the engine mixture ratio regulation instruction issued by the onboard computer of the carrier rocket, thereby achieving the engine mixture ratio regulation.

The managing, by the redundancy management module, an operation mode of each of the three control modules in the step 2 includes: 1) managing the three control modules to be in a triple control module operation mode in following three cases: a case that a result of the cross-comparison on the control signals outputted from the three control modules shows that the control signals outputted from the three control modules are consistent and a result of the state monitoring on the control signals outputted from the three control modules shows that each of the three control modules operates normally; a case that a result of the cross-comparison on the control signals outputted from the three control modules shows that the control signals outputted from the three control modules are consistent and a result of the state monitoring on the control signals outputted from the three control modules shows that each of the three control modules operates abnormally; and a case that a result of the cross-comparison on the control signals outputted from the three control modules shows that the control signals outputted from the three control modules are inconsistent and a result of the state monitoring on the control signals outputted from the three control modules shows that each of the three control modules operates abnormally; 2) managing two control modules operating normally to be in a double control module operation mode in following three cases: a case that a result of the cross-comparison on the control signals outputted from the three control modules shows that the control signals outputted from the three control modules are consistent and a result of the state monitoring on the control signals outputted from the three control modules shows that one of the three control modules operates abnormally, then cutting off output of the PWM wave control signals from the control module operating abnormally and isolating the control module operating abnormally; a case that a result of the cross-comparison on the control signals outputted from the three control modules shows that the control signals outputted from the three control modules are inconsistent and a result of the state monitoring on the control signals outputted from the three control modules shows that each of the three control modules operates normally, then determining one control module operating abnormally by voting, cutting off output of the PWM wave control signals from the control module operating abnormally and isolating the control module operating abnormally; and a case that a result of the cross-comparison on the control signals outputted from the three control modules shows that the control signals outputted from the three control modules are inconsistent and a result of the state monitoring on the control signals outputted from the three control modules shows that one of the three control modules operates abnormally, then cutting off output of the PWM wave control signals from the control module operating abnormally and isolating the control module operating abnormally; 3) managing a control module operating normally to be in a single control module operation mode in following four cases: a case that in the triple control module operation mode, a result of the state monitoring on the control signals outputted from the three control modules shows that two of the three control modules operates abnormally and a result of the cross-comparison on the control signals outputted from the three control modules shows that the control signals outputted from the three control modules are consistent, then cutting off outputs of the PWM wave control signals from the two control modules operating abnormally and isolating the two control modules operating abnormally; a case that in the triple control module operation mode, a result of the state monitoring on the control signals outputted from the three control modules shows that two of the three control modules operates abnormally and a result of the cross-comparison on the control signals outputted from the three control modules shows that the control signals outputted from the three control modules are inconsistent, then cutting off outputs of the PWM wave control signals from the two control modules operating abnormally and isolating the two control modules operating abnormally; a case that in the double control module operation mode, a result of the cross-comparison on the control signals outputted from the two control modules shows that the control signals outputted from the two control modules are consistent and a result of the state monitoring on the control signals outputted from the two control modules shows that one of the two control modules operates abnormally, then cutting off output of the PWM wave control signals from the control module operating abnormally and isolating the control module operating abnormally; and a case that in the double control module operation mode, a result of the cross-comparison on the control signals outputted from the two control modules shows that the control signals outputted from the two control modules are inconsistent and a result of the state monitoring on the control signals outputted from the two control modules shows that one of the two control modules operates abnormally, then cutting off output of the PWM wave control signals from the control module operating abnormally and isolating the control module operating abnormally.

In the triple control module operation mode, the redundancy management module selects, based on a predetermined priority order, one control module having the highest priority among the three control modules to output the PWM wave control signals.

In the double control module operation mode, the redundancy management module selects, based on a predetermined priority order, a control module having a higher priority among the two control modules to output the PWM wave control signals, where a process of the redundancy management module selecting, based on a predetermined priority order, a control module having a higher priority among the two control modules to output the PWM wave control signals includes: a) in a case that a result of the cross-comparison on the control signals outputted from the two control modules shows that the control signals outputted from the two control modules are consistent and a result of the state monitoring on the control signals outputted from the two control modules shows that each of the two control modules operates normally, selecting, based on the predetermined priority order, a control module having a higher priority among the two control modules to output the PWM wave control signals; b) in a case that a result of the cross-comparison on the control signals outputted from the two control modules shows that the control signals outputted from the two control modules are consistent and a result of the state monitoring on the control signals outputted from the two control modules shows that each of the two control modules operates abnormally, selecting, based on the predetermined priority order, a control module having a higher priority among the two control modules to output the PWM wave control signals; c) in a case that a result of the cross-comparison on the control signals outputted from the two control modules shows that the control signals outputted from the two control modules are inconsistent and a result of the state monitoring on the control signals outputted from the two control modules shows that each of the two control modules operates normally, selecting, based on the predetermined priority order, a control module having a higher priority among the two control modules to output the PWM wave control signals; and d) in a case that a result of the cross-comparison on the control signals outputted from the two control modules shows that the control signals outputted from the two control modules are inconsistent and a result of the state monitoring on the control signals outputted from the two control modules shows that each of the two control modules operates abnormally, selecting, based on the predetermined priority order, a control module having a higher priority among the two control modules to output the PWM wave control signals.

In the single control module operation mode, the redundancy management module selects the control module operating normally to output the PWM wave control signals.

Beneficial technique effects of the present disclosure are described as follows.

(1) According to the electromechanical servo system for thrust and mixture ratio regulation of a liquid rocket engine provided in the present disclosure, energy of the system is provided by a carrier rocket power supply, such that it is unnecessary to set an energy supply system. In addition, a control mechanism, a driving mechanism and an actuating mechanism are simple, thereby greatly simplifying the engine gas-liquid system and improving the reliability and the use maintainability.

(2) The electromechanical actuator according to the present disclosure is designed to have two sets of motor windings. Single electromechanical actuator is adopted to ensure a small size and a light weight. In addition, by a redundancy of two sets of windings, the electromechanical actuator can still operate normally in a case that an open-circuit fault or a short-circuit fault occurs in one set of windings, thereby improving the reliability of the electromechanical actuator and avoiding a large size and a large weight resulting of a multi-redundancy electromechanical actuator.

(3) The servo driver according to the present disclosure is designed to have double-redundancy. The servo driver cooperates with the electromechanical actuator having two sets of windings to realize "one drive failure-operation", thereby improving the reliability of the servo driver.

(4) According to the electromechanical servo system for thrust and mixture ratio regulation of a liquid rocket engine provided in the present disclosure, the electromechanical actuator is implemented as a permanent magnet synchronous motor, thereby realizing a regulation with a high accuracy and a fast response under a condition of a wide speed range and a wide load range and improving control characteristics of the thrust and mixture ratio regulation of an engine.

(5) According to the electromechanical servo system for regulating thrust and mixture ratio of a liquid rocket engine provided in the present disclosure, a system configuration of "triple-redundancy control and double-redundancy driving" is adopted, such that the system possesses a capability of "two control failures-operation and one drive failure-operation", thereby ensuring thrust and mixture ratio regulation of an engine with a high reliability. In addition, the system can be applied in different thrust and mixture ratio regulation tasks of different liquid rocket engines by adjusting a control software of the servo controller and driving power supply parameters of the servo driver.

BRIEF DESCRIPTION OF THE DRAWINGS

FIG. 1 is a schematic diagram of a multi-redundancy electromechanical servo system for thrust and mixture ratio regulation of a liquid rocket engine according to the present disclosure.

DETAILED DESCRIPTION OF EMBODIMENTS

The present disclosure is further described in detail below in conjunction with the drawings and embodiments.

An electromechanical servo system with "triple-redundancy control and double-redundancy driving" is provided according to the present disclosure, and a thrust and mixture ratio regulation with a high reliability, a high accuracy and a fast response of a liquid rocket engine can be implemented by the system. As shown in FIG. 1, the system includes a servo controller 1, a thrust regulation servo driver 2, a mixture ratio regulation servo driver 3, a thrust regulation electromechanical actuator 4, a mixture ratio regulation electromechanical actuator 5, a thrust regulation position sensor 6, a mixture ratio regulation position sensor 7, a thrust regulator 8 and a mixture ratio regulator 9.

The servo controller 1 is a triple-redundancy servo controller, and is configured to: receive an engine thrust regulation instruction issued by an onboard computer of a carrier rocket and position information of the thrust regulator 8 fed back from the thrust regulation position sensor 6, perform a thrust regulation calculation to obtain a thrust regulation PWM wave control signal, and output the thrust regulation PWM wave control signal to the thrust regulation servo driver 2. The servo controller 1 is further configured to: receive an engine mixture ratio regulation instruction issued by the onboard computer of the carrier rocket and position information of the mixture ratio regulator 9 fed back from the mixture ratio regulation position sensor 7, perform a mixture ratio regulation calculation to obtain a mixture ratio regulation PWM wave control signal, and output the mixture ratio regulation PWM wave control signal to the mixture ratio regulation servo driver 3.

The triple-redundancy servo controller 1 includes a first control module 101, a second control module 102, a third control module 103 and a redundancy management module 104. Each of the three independent control modules is configured to: receive the engine thrust regulation instruction and the engine mixture ratio regulation instruction and the position information fed back from the thrust regulation position sensor 6 and the mixture ratio regulation position sensor 7, independently perform the thrust regulation calculation and the mixture ratio regulation calculation to obtain the thrust regulation PWM wave control signal and the mixture ratio regulation PWM wave control signal. The redundancy management module 104 selects, based on a predetermined priority order, results of a state monitoring and a cross-comparison, a control module having the highest priority among control modules operating normally to output the PWM wave control signals to the servo drivers.

The thrust regulation servo driver 2 is configured to: invert a direct current power supply from the carrier rocket based on the thrust regulation PWM wave control signal to produce a three-phase sinusoidal current with a variable amplitude and a variable frequency and outputs the sinusoidal current to the thrust regulation electromechanical actuator 4. The thrust regulation electromechanical actuator 4 moves under a drive of the sinusoidal current outputted by the thrust regulation servo driver 2 and drives the thrust regulator 8 to move, to cause the thrust regulator 8 to reach a position corresponding to the engine thrust regulation instruction.

The mixture ratio regulation servo driver 3 is configured to: invert the direct current power supply from the carrier rocket based on the mixture ratio regulation PWM wave control signal to produce a three-phase sinusoidal current with a variable amplitude and a variable frequency, and output the sinusoidal current to the mixture ratio regulation electromechanical actuator 4. The mixture ratio regulation electromechanical actuator moves under a drive of the sinusoidal current outputted by the mixture ratio regulation servo driver 3 and drives the mixture ratio regulator 8 to move, to cause the mixture ratio regulator to reach a position corresponding to the engine mixture ratio regulation instruction.

Each of the thrust regulation servo driver 2 and the mixture ratio regulation servo driver 3 is a double-redundancy servo driver. The thrust regulation servo driver 2 includes a first driving module 201 and a second driving module 202. The mixture ratio regulation servo driver 3 includes a third driving module 301 and a fourth driving module 302. The thrust regulation servo driver 2 is connected to a terminal of the triple-redundancy servo controller 1 at which the thrust regulation PWM wave control signal is outputted. The mixture ratio regulation servo driver 3 is connected to a terminal of the triple-redundancy servo controller 1 at which the mixture ratio regulation PWM wave control signal is outputted. The first driving module 201 and the second driving module 202 operate independently. Each of the first driving module 201 and the second driving module 202 receives the thrust regulation PWM wave control signal from the servo controller 1, inverts the power supply to produce a three-phase sinusoidal current with a variable amplitude and a variable frequency and outputs the sinusoidal current to the thrust regulation electromechanical actuator 4. The third driving module 301 and the fourth driving module 302 operate independently. Each of the third driving module 301 and the fourth driving module 302 receives the mixture ratio regulation PWM wave control signal from the servo controller 1, inverts the power supply to produce a three-phase sinusoidal current with a variable amplitude and a variable frequency and outputs the sinusoidal current to the mixture ratio regulation electromechanical actuator 5.

Each of the thrust regulation electromechanical actuator 4 and the mixture ratio regulation electromechanical actuator 5 includes a servomotor and a speed reducer. The servomotor is configured to convert electric energy supplied from the servo driver into mechanical energy and produce a movement with specified features. The speed reducer is configured to convert the movement of the servomotor into a movement of the thrust regulator or the mixture ratio regulator, such that the thrust regulator or the mixture ratio regulator reaches a position corresponding to the instructions in a rate indicated by the instructions, thereby achieving a thrust regulation or a mixture ratio regulation of the engine by changing an opening angle of the thrust regulator or the mixture ratio regulator. The servomotors in the thrust regulation electromechanical actuator 4 and the mixture ratio regulation electromechanical actuator 5 are permanent magnet synchronous motors which are driven and controlled by the sinusoidal current, and a high accuracy regulation can be achieved within a wide rotational speed range.

The thrust regulation electromechanical actuator 4 and the mixture ratio regulation electromechanical actuator 5 are double-windings electromechanical actuators, that is, each of the servomotors in the thrust regulation electromechanical actuator 4 and the mixture ratio regulation electromechanical actuator 5 includes two independent sets of three-phase windings.

Specifically, the thrust regulation electromechanical actuator 4 includes a first servomotor 401 and a first speed reducer 402. The mixture ratio regulation electromechanical actuator 5 includes a second servomotor 501 and a second speed reducer 502. The first servomotor 401 includes two independent sets of three-phase windings, which are a first motor windings 401A and a second motor windings 401B. The first motor windings 401A is connected to the first driving module 201, the second motor windings 401B is connected to the second driving module 202. The second servomotor 501 includes two independent sets of three-phase windings, which are a third motor windings 501A and a fourth motor windings 501B. The third motor windings 501A is connected to the third driving module 301, the fourth motor windings 501B is connected to the fourth driving module 302.

The thrust regulation position sensor 6 and the mixture ratio regulation position sensor 7 are triple-redundancy position sensors. The thrust regulation position sensor 6 includes a first sub-position sensor 601, a second sub-position sensor 602 and a third sub-position sensor 603, which are connected to an output shaft of the thrust regulation electromechanical actuator 4. The mixture ratio regulation position sensor 7 includes a fourth sub-position sensor 701, a fifth sub-position sensor 702 and a sixth sub-position sensor 703, which are connected to an output shaft of the mixture ratio regulation electromechanical actuator 5. The first sub-position sensor 601, the second sub-position sensor 602 and the third sub-position sensor 603 are in one-to-one correspondence with the three control modules in the servo controller 1. The fourth sub-position sensor 701, the fifth sub-position sensor 702 and the sixth sub-position sensor 703 are in one-to-one correspondence with the three control modules in the servo controller 1. A position feedback output terminal of each sub-position sensor is connected to a position feedback input terminal of a control module corresponding to the sub-position sensor. Each sub-position sensor detects a position of the output shaft of the electromechanical actuator independently to produce position information and feeds the position information back to the control module in the servo controller 1 corresponding to the sub-position sensor.

The thrust regulator 8 and the mixture ratio regulator 9 are regulation valves of the liquid rocket engine. The thrust regulator 8 moves under a drive of the thrust regulation electromechanical actuator 4. The mixture ratio regulator 9 moves under a drive of the mixture ratio regulation electromechanical actuator 5.

The method for implementing the present disclosure is as follows.

(1) When the carrier rocket regulates the thrust or the mixture ratio of the engine, the first control module 101, the second control module 102 and the third control module 103 of the triple-redundancy servo controller 1 receive the engine thrust regulation instruction and the engine mixture ratio regulation instruction issued by the onboard computer of the carrier rocket. The first control module 101 receives the position information of the thrust regulator 8 fed back from the first sub-position sensor 601 and the position information of the mixture ratio regulator 9 fed back from the sixth sub-position sensor 703. The second control module 102 receives the position information of the thrust regulator 8 fed back from the second sub-position sensor 602 and the position information of the mixture ratio regulator 9 fed back from the fifth sub-position sensor 702. The third control module 103 receives the position information of the thrust regulator 8 fed back from the third sub-position sensor 603 and the position information of the mixture ratio regulator 9 fed back from the fourth sub-position sensor 701.

(2) The first control module 101, the second control module 102 and the third control module 103 of the triple-redundancy servo controller 1 independently perform, based on the received engine thrust regulation instruction and the engine mixture ratio regulation instruction and position information fed back from the thrust regulation position sensor and the mixture ratio regulation position sensor, the thrust regulation calculation and the mixture ratio regulation calculation to obtain the thrust regulation PWM wave control signal and the mixture ratio regulation PWM wave control signal. The redundancy management module 104 performs a state monitoring and a cross-comparison on the PWM wave control signals outputted from the three control modules 101, 102 and 103 to achieve a fault detection, a fault location and a fault isolation of the control modules. The redundancy management module 104 finally selects, based on a PWM wave control signal output priority of "the first control module 101>the second control module 102>the third control module 103", one control module to output the thrust regulation PWM wave control signal to the two driving modules 201 and 202 of the double-redundancy thrust regulation servo driver 2 and output the mixture ratio regulation PWM wave control signal to the two driving modules 301 and 302 of the double-redundancy mixture ratio regulation servo driver 3. That is, if results of the state monitoring and the cross-comparison indicate that signals outputted from the first control module 101, the second control module 102 and the third control module 103 are normal, in this case, the first control module 101 outputs the thrust regulation PWM wave control signal to the two driving modules 201 and 202 of the double-redundancy thrust regulation servo driver 2 and outputs the mixture ratio regulation PWM wave control signal to the two driving modules 301 and 302 of the double-redundancy mixture ratio regulation servo driver 3. If a signal outputted from the first control module 101 is abnormal and signals outputted from the second control module 102 and the third control module 103 are normal, in this case, the second control module 102 outputs the thrust regulation PWM wave control signal to the two driving modules 201 and 202 of the double-redundancy thrust regulation servo driver 2 and outputs the mixture ratio regulation PWM wave control signal to the two driving modules 301 and 302 of the double-redundancy mixture ratio regulation servo driver 3.

(3) The first driving module 201 and the second driving module 202 of the double-redundancy thrust regulation servo driver 2 independently invert the power supply based on the thrust regulation PWM wave control signal. The first driving module 201 produces the three-phase sinusoidal current with a variable amplitude and a variable frequency and provides the sinusoidal current to the first motor windings 401A of the servomotor 401. The second driving module 202 produces the three-phase sinusoidal current with a variable amplitude and a variable frequency and provides the sinusoidal current to the second motor windings 401B of the servomotor 401. The first motor windings 401A and the second motor windings 401B drive the first servomotor 401 to operate. The operation of the first servomotor 401 is converted into a movement of the thrust regulator 8 by the first speed reducer 402. When the triple-redundancy thrust regulation position sensor 6 feeds back that the thrust regulator 8 reaches the position corresponding to the engine thrust regulation instruction, the first servomotor 401 is stopped and the thrust regulator 8 stops moving, thereby completing a process of the engine thrust regulation.

The third driving module 301 and the fourth driving module 302 of the double-redundancy mixture ratio regulation servo driver 3 independently invert the power supply based on the mixture ratio regulation PWM wave control signal. The third driving module 301 produces the three-phase sinusoidal current with a variable amplitude and a variable frequency and provides the sinusoidal current to the third motor windings 501A of the second servomotor 501. The fourth driving module 302 produces the three-phase sinusoidal current with a variable amplitude and a variable frequency and provides the sinusoidal current to the fourth motor windings 501B of the second servomotor 501. The third motor windings 501A and the fourth motor windings 501B drive the second servomotor 501 to operate. The operation of the second servomotor 501 is converted into a movement of the mixture ratio regulator 9 by the second speed reducer 502. When the triple-redundancy mixture ratio regulation position sensor 7 feeds back that the mixture ratio regulator 9 reaches the position corresponding to the engine mixture ratio regulation instruction, the second servomotor 501 is stopped and the mixture ratio regulator 9 stops moving, thereby completing a process of the engine mixture ratio regulation.

According to the present disclosure, the triple-redundancy servo controller 1, the triple-redundancy thrust regulation position sensor 6 and the triple-redundancy mixture ratio regulation position sensor 7 constitute the "triple-redundancy control" of the servo system, such that the servo system possesses a capability of "two control failures-operation". The double-redundancy thrust regulation servo driver 2, the double-redundancy mixture ratio regulation servo driver 3, the double-windings thrust regulation electromechanical actuator 4 and the double-windings mixture ratio regulation electromechanical actuator 5 constitute the "double-redundancy driving" of the servo system, such that the servo system possesses a capability of "one drive failure-operation". A redundancy management is completed by the redundancy management module 104 of the servo controller 1. The servo system according to the present disclosure possesses a capability of "control operation with faulty two sets of components of the triple-redundancy control including three sets of components".

(1) In a case that a fault occurs in one control module of the triple-redundancy servo controller 1, the redundancy management module 104 performs the state monitoring and the cross-comparison on the PMW wave control signals outputted from the three control modules, to complete a fault detection, locate a faulty module, cut off output of the PWM wave control signals from the faulty control module and isolate the faulty control module. The servo controller 1 enters into a mode of "two control modules operate with faulty one set of components of the triple-redundancy control including three sets of components". The redundancy management module 104 performs the state monitoring and the cross-comparison on the control signals outputted from the two control modules and selects, based on a predetermined module output priority, a control module having a higher priority to output the PWM wave control signals. The servo system operates normally.

(2) In a case that faults occur in two control modules of the triple-redundancy servo controller 1, the redundancy management module 104 performs the state monitoring and the cross-comparison on the PMW wave control signals outputted from the three control modules, to complete a fault detection, locate a faulty module, cut off output of the PWM wave control signals from the faulty control module and isolate the faulty control module. The servo controller 1 enters into a mode of "one control module operates with faulty two sets of components of the triple-redundancy control including three sets of components". The redundancy management module 104 only performs the state monitoring on the control signal outputted from the single control module and does not perform the cross-comparison. The PWM wave control signals are outputted by the single control module. The servo system operates normally.

(3) In a case that a fault occurs in one or two sub-position sensors of the triple-redundancy thrust regulation position sensor 6 or the triple-redundancy mixture ratio regulation position sensor 7, it may cause an abnormal fault in a process of one or two control modules corresponding to the faulty sub-position sensors producing the thrust regulation PWM wave control signal or the mixture ratio regulation PWM wave control signal. The redundancy management module 104 cuts off output of the faulty thrust regulation PWM wave control signal or the faulty mixture ratio regulation PWM wave control signal of the one or two control modules. The servo controller 1 enters into a mode of "two control modules operate with faulty one set of components of the triple-redundancy control including three sets of components" or "one control module operates with faulty two sets of components of the triple-redundancy control including three sets of components". The servo system operates normally.

Specifically, an operation process of the redundancy management module 104 of the servo controller 1 performing a redundancy management on the three control modules 101, 102 and 103 is as follows.

(1) The mode of "three control modules operate"

a) The redundancy management module 104 performs the state monitoring and the cross-comparison on the control signals outputted from the three control modules. In a case that a result of the cross-comparison on the control signals outputted from the three control modules shows that the control signals outputted from the three control modules are consistent and a result of the state monitoring on the control signals outputted from the three control modules shows that each of the three control modules operates normally, then the mode of "three control modules operate" is entered, that is, a control module having the highest priority is selected, based on a predetermined priority order, among the three control modules to output the PWM wave control signals.

b) In a case that a result of the cross-comparison on the control signals outputted from the three control modules shows that the control signals outputted from the three control modules are consistent and a result of the state monitoring on the control signals outputted from the three control modules shows that one of the three control modules operates abnormally, then output of the PWM wave control signals from the control module operating abnormally is cut off and the control module operating abnormally is isolated. The servo controller 1 enters into the mode of "two control modules operate with faulty one set of components of the triple-redundancy control including three sets of components".

c) In a case that a result of the cross-comparison on the control signals outputted from the three control modules shows that the control signals outputted from the three control modules are consistent and a result of the state monitoring on the control signals outputted from the three control modules shows that two of the three control modules operates abnormally, then outputs of the PWM wave control signals from the two control modules operating abnormally are cut off and the two control modules operating abnormally are isolated. The servo controller 1 enters into the mode of "one control module operates with faulty two sets of components of the triple-redundancy control including three sets of components". The PWM wave control signals are outputted by the single control module operating normally.

d) In a case that a result of the cross-comparison on the control signals outputted from the three control modules shows that the control signals outputted from the three control modules are consistent and a result of the state monitoring on the control signals outputted from the three control modules shows that each of the three control modules operates abnormally, then the mode of "three control modules operate" is entered, that is, a control module having the highest priority is selected, based on a predetermined priority order, among the three control modules to output the PWM wave control signals.

e) In a case that a result of the cross-comparison on the control signals outputted from the three control modules shows that the control signals outputted from the three control modules are inconsistent and a result of the state monitoring on the control signals outputted from the three control modules shows that each of the three control modules operates normally, then the control module operating abnormally is determined by voting, output of the PWM wave control signals from the control module operating abnormally is cut off and the control module operating abnormally is isolated. The servo controller 1 enters into the mode of "two control modules operate with faulty one set of components of the triple-redundancy control including three sets of components".

f) In a case that a result of the cross-comparison on the control signals outputted from the three control modules shows that the control signals outputted from the three control modules are inconsistent and a result of the state monitoring on the control signals outputted from the three control modules shows that one of the three control modules operates abnormally, then output of the PWM wave control signals from the control module operating abnormally is cut off and the control module operating abnormally is isolated. The servo controller 1 enters into the mode of "two control modules operate with faulty one set of components of the triple-redundancy control including three sets of components".

g) In a case that a result of the cross-comparison on the control signals outputted from the three control modules shows that the control signals outputted from the three control modules are inconsistent and a result of the state monitoring on the control signals outputted from the three control modules shows that two of the three control modules operates abnormally, then outputs of the PWM wave control signals from the two control modules operating abnormally are cut off and the two control modules operating abnormally are isolated. The servo controller 1 enters into the mode of "one control module operates with faulty two sets of components of the triple-redundancy control including three sets of components". The PWM wave control signals are outputted by the single control module operating normally.

h) In a case that a result of the cross-comparison on the control signals outputted from the three control modules shows that the control signals outputted from the three control modules are inconsistent and a result of the state monitoring on the control signals outputted from the three control modules shows that each of the three control modules operates abnormally, then the mode of "three control modules operate" is entered, that is, a control module having the highest priority is selected, based on a predetermined priority order, among the three control modules to output the PWM wave control signals.

(2) The mode of "two control modules operate with faulty one set of components of the triple-redundancy control including three sets of components"

In a case that output of the PWM wave control signals from one control module is cut off and the control module is isolated because the state monitoring shows that the control module operates abnormally or a vote shows that the control module operates abnormally, the servo controller 1 enters into the mode of "two control modules operate with faulty one set of components of the triple-redundancy control including three sets of components". The following strategies are adopted in the operation mode of "two control modules operate with faulty one set of components of the triple-redundancy control including three sets of components".

a) In a case that a result of the cross-comparison on the control signals outputted from the two control modules shows that the control signals outputted from the two control modules are consistent and a result of the state monitoring on the control signals outputted from the two control modules shows that each of the two control modules operates normally, then a control module having a higher priority is selected, based on a predetermined module output priority order, among the two control modules to output the PWM wave control signals.

b) In a case that a result of the cross-comparison on the control signals outputted from the two control modules shows that the control signals outputted from the two control modules are consistent and a result of the state monitoring on the control signals outputted from the two control modules shows that one of the two control modules operates abnormally, then output of the PWM wave control signals from the control module operating abnormally is cut off and the control module operating abnormally is isolated. The servo controller 1 enters into the mode of "one control module operates with faulty two sets of components of the triple-redundancy control including three sets of components". The PWM wave control signals are outputted by the single control module.

c) In a case that a result of the cross-comparison on the control signals outputted from the two control modules shows that the control signals outputted from the two control modules are consistent and a result of the state monitoring on the control signals outputted from the two control modules shows that each of the two control modules operates abnormally, then a control module having a higher priority is selected, based on a predetermined module output priority order, among the two control modules to output the PWM wave control signals.

d) In a case that a result of the cross-comparison on the control signals outputted from the two control modules shows that the control signals outputted from the two control modules are inconsistent and a result of the state monitoring on the control signals outputted from the two control modules shows that each of the two control modules operates normally, then a control module having a higher priority is selected, based on a predetermined module output priority order, among the two control modules to output the PWM wave control signals.

e) In a case that a result of the cross-comparison on the control signals outputted from the two control modules shows that the control signals outputted from the two control modules are inconsistent and a result of the state monitoring on the control signals outputted from the two control modules shows that one of the two control modules operates abnormally, then output of the PWM wave control signals from the control module operating abnormally is cut off and the control module operating abnormally is isolated. The servo controller 1 enters into the mode of "one control module operates with faulty two sets of components of the triple-redundancy control including three sets of components". The PWM wave control signals are outputted by the single control module.

f) In a case that a result of the cross-comparison on the control signals outputted from the two control modules shows that the control signals outputted from the two control modules are inconsistent and a result of the state monitoring on the control signals outputted from the two control modules shows that each of the two control modules operate abnormally, then a control module having a higher priority is selected, based on a predetermined module output priority order, among the two control modules to output the PWM wave control signals.

(3) The mode of "one control module operates with faulty two sets of components of the triple-redundancy control including three sets of components"

The servo controller 1 enters into the mode of "one control module operates with faulty two sets of components of the triple-redundancy control including three sets of components" when secondary fault occurs in the servo controller 1. A cross-comparison between the control modules is not performed anymore and the PWM wave control signals are outputted by the one control module operating normally.

The servo system possesses a capability of "one drive failure-operation" described as follows.

(1) The double-redundancy thrust regulation servo driver 2 and the double-windings thrust regulation electromechanical actuator 4 constitute two independent thrust regulation driving circuit loops, which include a driving circuit loop of "the driving module 201—the motor windings 401A" and a driving circuit loop of "the driving module 202—the motor windings 401B". The redundancy management module 104 of the servo controller 1 detects parameters such as currents and voltages of the two independent driving circuit loops and temperatures of the driving modules in a real time manner, to monitor a fault. In a case that a parameter of the fault monitoring exceeds a threshold due to a fault in the driving module or the motor windings of a driving circuit loop, the redundancy management module 104 cuts off output of the PWM wave control signals corresponding to the driving module of the faulty driving circuit loop and simultaneously cuts off the faulty driving circuit loop, such that the faulty driving circuit loop is in an open circuit. The thrust regulation servo driver 2 and the thrust regulation electromechanical actuator 4 enters into the operation mode of "faulty one set of components of the double-redundancy driving including two sets of components and one driving module-one motor windings". The servo system operates normally.

(2) The double-redundancy mixture ratio regulation servo driver 3 and the double-windings mixture ratio regulation electromechanical actuator 5 constitute two independent mixture ratio regulation driving circuit loops, which include a driving circuit loop of "the driving module 301—the motor windings 501A" and a driving circuit loop of "the driving module 302—the motor windings 501B". The redundancy management module 104 of the servo controller 1 detects parameters such as currents and voltages of the two independent driving circuit loops and temperatures of the driving modules in a real time manner, to monitor a fault. In a case that a parameter of the fault monitoring exceeds a threshold due to a fault in the driving module or the motor windings of a driving circuit loop, the redundancy management module 104 cuts off output of the PWM wave control signals corresponding to the driving module of the faulty driving circuit loop and simultaneously cuts off the faulty driving circuit loop, such that the faulty driving circuit loop is in an open circuit. The servo driver 3 and the electromechanical actuator 5 enters into the operation mode of "faulty one set of components of the double-redundancy driving including two sets of components and one driving module-one motor windings". The servo system operates normally.

Contents not described in detail in the description of the present disclosure are technologies well known to those skilled in the art.

The invention claimed is:

1. A method performed by a multi-redundancy electromechanical servo system for liquid rocket engine regulation, wherein the multi-redundancy electromechanical servo system comprises: a servo controller (1), a thrust regulation servo driver (2), a mixture ratio regulation servo driver (3), a thrust regulation electromechanical actuator (4), a mixture ratio regulation electromechanical actuator (5), a thrust regulation position sensor (6), a mixture ratio regulation position sensor (7), a thrust regulator (8) and a mixture ratio regulator (9); wherein the servo controller (1) comprises three independent control modules and a redundancy management module (104); each of the control modules is configured to: receive an engine thrust regulation instruction and an engine mixture ratio regulation instruction issued by an onboard computer of a carrier rocket and position information fed back from the thrust regulation position sensor (6) and the mixture ratio regulation position sensor (7), obtain a thrust regulation PWM wave control signal based on the engine thrust regulation instruction and the position information fed back from the thrust regulation position sensor (6), obtain a mixture ratio regulation PWM wave control signal based on the engine mixture ratio regulation instruction and the position information fed back from the mixture ratio regulation position sensor (7), and output the thrust regulation PWM wave control signal and the mixture ratio regulation PWM wave control signal to the redundancy management module (104);

the redundancy management module (104) is configured to: perform a state monitoring and a cross-comparison on the control signals outputted from the three control modules, and select a proper control module to output the thrust regulation PWM wave control signal to the thrust regulation servo driver (2) and output the mixture ratio regulation PWM wave control signal to the mixture ratio regulation servo driver (3);

the thrust regulation servo driver (2) is configured to: invert a direct current power supply from the carrier rocket based on the thrust regulation PWM wave control signal to produce a three-phase sinusoidal current with a variable amplitude and a variable frequency, and output the sinusoidal current to the thrust regulation electromechanical actuator (4);

the mixture ratio regulation servo driver (3) is configured to: invert the direct current power supply from the carrier rocket based on the mixture ratio regulation PWM wave control signal to produce a three-phase sinusoidal current with a variable amplitude and a variable frequency, and output the sinusoidal current to the mixture ratio regulation electromechanical actuator (5);

the thrust regulation electromechanical actuator (4) is configured to: move under a drive of the sinusoidal current outputted by the thrust regulation servo driver (2), and drive the thrust regulator (8) to move to cause the thrust regulator (8) to reach a position corresponding to the engine thrust regulation instruction issued by the onboard computer of the carrier rocket;

the mixture ratio regulation electromechanical actuator (5) is configured to: move under a drive of the sinusoidal current outputted by the mixture ratio regulation servo driver (3), and drive the mixture ratio regulator (9) to move to cause the mixture ratio regulator (9) to reach a position corresponding to the engine mixture ratio regulation instruction issued by the onboard computer of the carrier rocket;

the thrust regulation position sensor (6) is configured to: collect position information of the thrust regulator (8) in a real time manner, and feed the position information of the thrust regulator (8) back to the servo controller (1); and the mixture ratio regulation position sensor (7) is configured to: collect position information of the mixture ratio regulator (9) in a real time manner, and feed the position information of the mixture ratio regulator (9) back to the servo controller (1), wherein the thrust regulation servo driver (2) comprises two independent driving modules, wherein each of the driving modules is configured to: receive the thrust regulation PWM wave control signal from the servo controller (1), independently invert the power supply to produce a three-phase sinusoidal current with a variable amplitude and a variable frequency, and output the sinusoidal current to the thrust regulation electromechanical actuator (4), wherein the mixture ratio regulation servo driver (3) comprises two independent driving modules, wherein each of the driving modules is configured to: receive the mixture ratio regulation PWM wave control signal from the servo controller (1), independently invert the power supply to produce a three-phase sinusoidal current with a variable amplitude and a variable frequency, and output the sinusoidal current to the mixture ratio regulation electromechanical actuator (5), wherein each of the thrust regulation electromechanical actuator (4) and the mixture ratio regulation electromechanical actuator (5) comprises a servomotor and a speed reducer;

the servomotor (401) of the thrust regulation electromechanical actuator (4) is configured to move under the drive of the three-phase sinusoidal current with a variable amplitude and a variable frequency outputted by the thrust regulation servo driver (2); wherein the movement of the servomotor (401) is transmitted by the speed reducer (402) of the thrust regulation electromechanical actuator (4) and is converted into a movement of the thrust regulator (8), to cause the thrust regulator (8) to reach a position corresponding to the engine thrust regulation instruction issued by the onboard computer of the carrier rocket in a rate indicated by the instruction, thereby achieving an engine thrust regulation; and the servomotor (501) of the mixture ratio regulation electromechanical actuator (5) is configured to move under the drive of the three-phase sinusoidal current with a variable amplitude and a variable frequency outputted by the mixture ratio regulation servo driver (3); wherein the movement of the servomotor (501) is transmitted by the speed reducer (502) of the mixture ratio regulation electromechanical actuator (5) and is converted into a movement of the mixture ratio regulator (9), to cause the mixture ratio regulator (9) to reach a position corresponding to the engine mixture ratio regulation instruction issued by the onboard computer of the carrier rocket in a rate indicated by the instruction, thereby achieving an engine mixture ratio regulation, wherein the servomotor in each of the thrust regulation electromechanical actuator (4) and the mixture ratio regulation electromechanical actuator (5) comprises two independent sets of three-phase windings; the two sets of three-phase windings of the servomotor in the thrust regulation electromechanical actuator (4) are connected with the two driving modules of the thrust regulation servo driver (2) in one-to-one correspondence to form two independent thrust regulation driving circuits; and the two sets of three-phase windings of the servomotor in the mixture ratio regulation electromechanical actuator (5) are connected with the two driving modules of the mixture ratio regulation servo driver (3) in one-to-one correspondence to form two independent mixture ratio regulation driving circuits, wherein the method comprises:

step 1, receiving, by each of the three control modules of the servo controller, the engine thrust regulation instruction and the engine mixture ratio regulation instruction issued by the onboard computer of the carrier rocket and the position information of the thrust regulator fed back from the thrust regulation position sensor (6) and the position information of the mixture ratio regulator fed back from the mixture ratio regulation position sensor (7) in a real time manner; obtaining, by each of the control modules, the thrust regulation PWM wave control signal based on the engine thrust regulation instruction and the position information fed back from the thrust regulation position sensor (6), obtaining, by each of the control modules, the mixture ratio regulation PWM wave control signal based on the engine mixture ratio regulation instruction and the position information fed back from the mixture ratio regulation position sensor (7);

step 2, performing, by the redundancy management module (104), the state monitoring and the cross-comparison on the PWM wave control signals outputted from the three control modules; managing, by the redundancy management module (104), an operation mode of each of the three control modules based on results of the state monitoring and the cross-comparison; and selecting, by the redundancy management module (104), a proper control module to output the thrust regulation PWM wave control signal to the thrust regulation servo driver (2) and output the mixture ratio regulation PWM wave control signal to the mixture ratio regulation servo driver (3);

step 3, inverting, by each driving module of the thrust regulation servo driver (2), the direct current power supply from the carrier rocket based on the thrust regulation PWM wave control signal to produce the three-phase sinusoidal current with a variable amplitude and a variable frequency, to provide power to the set of three-phase windings of the thrust regulation electromechanical actuator corresponding to the driving module;

detecting, by the redundancy management module (104), currents and voltages of the two thrust regulation driving circuits in a real time manner to monitor a fault; when it is monitored that a fault occurs in a driving circuit, cutting off, by the redundancy management module (104), a loop of the driving circuit having the fault, to cause the driving circuit having the fault to be in an open circuit state;

step 4, moving, by the thrust regulation electromechanical actuator (4), and driving, by the thrust regulation electromechanical actuator (4), the thrust regulator (8) to move, to cause the thrust regulator (8) to reach a position corresponding to the engine thrust regulation instruction issued by the onboard computer of the carrier rocket, thereby achieving the engine thrust regulation;

step 5, inverting, by each of the two driving modules, the direct current power supply from the carrier rocket based on the mixture ratio regulation PWM wave control signal to produce the three-phase sinusoidal current with a variable amplitude and a variable frequency, to provide power to the set of three-phase windings of the mixture ratio regulation electromechanical actuator corresponding to the driving module;

detecting, by the redundancy management module (104), currents and voltages of the two mixture ratio regulation driving circuits in a real time manner, to monitor a fault; when it is monitored that a fault occurs in a driving circuit, cutting off, by the redundancy management module (104), a loop of the driving circuit having the fault, to cause the driving circuit having the fault to be in an open circuit state; and step 6, moving, by the mixture ratio regulation electromechanical actuator (5), and driving, by the mixture ratio regulation electromechanical actuator (5), the mixture ratio regulator (9) to move, to cause the mixture ratio regulator (9) to reach a position corresponding to the engine mixture ratio regulation instruction issued by the onboard computer of the carrier rocket, thereby achieving the engine mixture ratio regulation, wherein the managing, by the redundancy management module (104), an operation mode of each of the three control modules in the step 2 comprises:

1) managing the three control modules to be in a triple control module operation mode in following three cases:

a case that a result of the cross-comparison on the control signals outputted from the three control modules shows that the control signals outputted from the three control modules are consistent and a result of the state monitoring on the control signals outputted from the three control modules shows that each of the three control modules operates normally;

a case that a result of the cross-comparison on the control signals outputted from the three control modules shows that the control signals outputted from the three control modules are consistent and a result of the state monitoring on the control signals outputted from the three control modules shows that each of the three control modules operates abnormally; and a case that a result of the cross-comparison on the control signals outputted from the three control modules shows that the control signals outputted from the three control modules are inconsistent and a result of the state monitoring on the control signals outputted from the three control modules shows that each of the three control modules operates abnormally;

2) managing two control modules operating normally to be in a double control module operation mode in following three cases:

a case that a result of the cross-comparison on the control signals outputted from the three control modules shows that the control signals outputted from the three control modules are consistent and a result of the state monitoring on the control signals outputted from the three control modules shows that one of the three control modules operates abnormally, then cutting off output of the PWM wave control signals from the control module operating abnormally and isolating the control module operating abnormally;

a case that a result of the cross-comparison on the control signals outputted from the three control modules shows that the control signals outputted from the three control modules are inconsistent and a result of the state monitoring on the control signals outputted from the three control modules shows that each of the three control modules operates normally, then determining one control module operating abnormally by voting, cutting off output of the PWM wave control signals from the control module operating abnormally and isolating the control module operating abnormally; and a case that a result of the cross-comparison on the control signals outputted from the three control modules shows that the control signals outputted from the three control modules are inconsistent and a result of the state monitoring on the control signals outputted from the three control modules shows that one of the three control modules operates abnormally, then cutting off output of the PWM wave control signals from the control module operating abnormally and isolating the control module operating abnormally;

3) managing a control module operating normally to be in a single control module operation mode in following four cases:

a case that in the triple control module operation mode, a result of the state monitoring on the control signals outputted from the three control modules shows that two of the three control modules operates abnormally and a result of the cross-comparison on the control signals outputted from the three control modules shows that the control signals outputted from the three control modules are consistent, then cutting off outputs of the PWM wave control signals from the two control modules operating abnormally and isolating the two control modules operating abnormally;

a case that in the triple control module operation mode, a result of the state monitoring on the control signals outputted from the three control modules shows that two of the three control modules operates abnormally and a result of the cross-comparison on the control signals outputted from the three control modules shows that the control signals outputted from the three control modules are inconsistent, then cutting off outputs of the PWM wave control signals from the two control modules operating abnormally and isolating the two control modules operating abnormally;

a case that in the double control module operation mode, a result of the cross-comparison on the control signals outputted from the two control modules shows that the control signals outputted from the two control modules are consistent and a result of the state monitoring on the control signals outputted from the two control modules shows that one of the two control modules operates abnormally, then cutting off output of the PWM wave control signals from the control module operating abnormally and isolating the control module operating abnormally; and a case that in the double control module operation mode, a result of the cross-comparison on the control signals outputted from the two control modules shows that the control signals outputted from the two control modules are inconsistent and a result of the state monitoring on the control signals outputted from the two control modules shows that one of the two control modules operates abnormally, then cutting off output of the PWM wave control signals from the control module operating abnormally and isolating the control module operating abnormally, wherein in the triple control module operation mode, the redundancy management module (104) selects, based on a predetermined priority order, one control module having a highest priority among the three control modules to output the PWM wave control signals, wherein in the double control module operation mode, the redundancy management module (104) selects, based on a predetermined priority order, a control module having a higher priority among the two control modules to output the PWM wave control signals, wherein a process of the redundancy management module (104) selecting, based on a predetermined priority order, a control module having a higher priority among the two control modules to output the PWM wave control signals comprises:

a) in a case that a result of the cross-comparison on the control signals outputted from the two control modules shows that the control signals outputted from the two control modules are consistent and a result of the state monitoring on the control signals outputted from the two control modules shows that each of the two control modules operates normally, selecting, based on the predetermined priority order, a control module having a higher priority among the two control modules to output the PWM wave control signals;

b) in a case that a result of the cross-comparison on the control signals outputted from the two control modules shows that the control signals outputted from the two control modules are consistent and a result of the state monitoring on the control signals outputted from the two control modules shows that each of the two control modules operates abnormally, selecting, based on the predetermined priority order, a control module having a higher priority among the two control modules to output the PWM wave control signals;

c) in a case that a result of the cross-comparison on the control signals outputted from the two control modules shows that the control signals outputted from the two control modules are inconsistent and a result of the state monitoring on the control signals outputted from the two control modules shows that each of the two control modules operates normally, selecting, based on the predetermined priority order, a control module having a higher priority among the two control modules to output the PWM wave control signals; and d) in a case that a result of the cross-comparison on the control signals outputted from the two control modules shows that the control signals outputted from the two control modules are inconsistent and a result of the state monitoring on the control signals outputted from the two control modules shows that each of the two control modules operates abnormally, selecting, based on the predetermined priority order, a control module having a higher priority among the two control modules to output the PWM wave control signals, wherein in the single control module operation mode, the redundancy management module (104) selects the control module operating normally to output the PWM wave control signals.

* * * * *